United States Patent
Bouchard et al.

(10) Patent No.: US 8,180,642 B2
(45) Date of Patent: May 15, 2012

(54) FACTORIAL HIDDEN MARKOV MODEL WITH DISCRETE OBSERVATIONS

(75) Inventors: Guillaume Bouchard, Crolles (FR); Jean-Marc Andreoli, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1380 days.

(21) Appl. No.: 11/756,833

(22) Filed: Jun. 1, 2007

(65) Prior Publication Data

US 2008/0300879 A1 Dec. 4, 2008

(51) Int. Cl.
*G10L 15/14* (2006.01)
(52) U.S. Cl. .......................... 704/256; 358/1.1; 358/1.9
(58) Field of Classification Search .................. 358/1.14, 358/1.1, 1.9; 704/256, E15.001
See application file for complete search history.

(56) References Cited

U.S. PATENT DOCUMENTS

| | | | |
|---|---|---|---|
| 7,165,029 B2 | 1/2007 | Nefian | |
| 7,209,883 B2 * | 4/2007 | Nefian | 704/256 |
| 7,424,464 B2 * | 9/2008 | Oliver et al. | 706/21 |
| 2004/0181712 A1 * | 9/2004 | Taniguchi et al. | 714/47 |
| 2004/0260548 A1 * | 12/2004 | Attias et al. | 704/236 |
| 2005/0256713 A1 | 11/2005 | Garg et al. | |
| 2006/0132826 A1 | 6/2006 | Ciriza et al. | |
| 2006/0206445 A1 | 9/2006 | Andreoli et al. | |
| 2007/0268509 A1 * | 11/2007 | Andreoli et al. | 358/1.14 |

OTHER PUBLICATIONS

Z.Ghahramani, M.I.Jordan, Factorial Hidden Markov Models, *MIT Artificial Intelligence Lab, CBDL Department of Brain and Cognitive Sciences*, AI Memo No. 1561, CBCL Paper No. 130, D.S. Touretzky, M.C.Mozer, and M.E.Hasselmo, editors, Advances in Neural Information Processing Systems, vol. 8, pp. 472-478. The MIT Press, Jan. 1996.

M.I.Jordan, Z.Ghahramani, T.S.Jaakkola, L.K.Saul, An Introduction to Variational Methods for Graphical Models, *Machine Learning*, 37, pp. 187-233, Kluwer Academic Publishers, Boston, 1998.

E.P.Xing, M.I.Jordan, S.Russell, A Generalized Mean Field Algorithm for Variational Interference in Exponential Families, *Proceedings of the 19th Annual Conference on Uncertainty in AI*, 2003.

W.Buntine, A.Jakulin, Applying Discrete PCA in Data Analysis, *Proceedings of the 20th Conference on Uncertainty in Artificial Intelligence (UAI)*, M.Chickering and J.Halpern, editors, pp. 59-66, Banff, Alberta, Canada, Aug. 2004.

(Continued)

*Primary Examiner* — King Poon
*Assistant Examiner* — Iriana Cruz
(74) *Attorney, Agent, or Firm* — Fay Sharpe LLP

(57) ABSTRACT

A method for analyzing hidden dynamics, includes acquiring discrete observations, each discrete observation having an observed value selected from two or more allowed discrete values. A factorial hidden Markov model (FHMM) relating the discrete observations with a plurality of hidden dynamics is constructed. A contribution of the state of each hidden dynamic to the discrete observation may be represented in the FHMM as a parameter of a nominal distribution which is scaled by a function of the state of the hidden dynamic. States of the hidden dynamics are inferred from the discrete observations based on the FHMM. Information corresponding to at least one inferred state of at least one of the hidden dynamics is output. The parameters of the contribution of each dynamic to the hidden states may be learnt from a large number of observations. An example of a networked printing system is used to demonstrate the applicability of the method.

22 Claims, 6 Drawing Sheets

OTHER PUBLICATIONS

A.Hyvärinen, E.Oja, Independent Component Analysis by General Nonlinear Hebbian-like Learning Rules, *Signal Processing*, Abstract, 1998.

A.Hyvärinen, E.Oja, Independent Component Analysis: Algorithms and Applications, *Neural Networks Research Centre*, Finland, 1999.

T.S.Jaakkola, M.I.Jordan, A Variational Approach to Bayesian Logistic Regression Models and Their Extensions, *Proceedings of the Sixth International Workshop on Artificial Intelligence and Statistics*, 1996.

N.H.Pontoppidan, M. Dyrholm, Fast Monaural Separation of Speech, *AES 23rd International Conference*, Copenhagen, Denmark, May 23-25, 2003. Audio Engineering Society, Inc.

K.P.Murphy, A Variational Approximation for Bayesian Networks with Discrete and Continous Latent Variables, *Proceedings of the 15th Annual Conference on Uncertainty in Artificial Intelligence (UAI-99)*, pp. 457-466, San Francisco, CA, 1999. Morgan Kaufmann Publishers.

C.Andrieu, N.DeFreitas, A.Doucet, M.I.Jordan, An Introduction to MCMC for Machine Learning, *Machine Learning*, 50, 5-43, 2003, Kluwer Academic Publishers.

J.Hershey, M. Casey, Audio-Visual Sound Separation Via Hidden Markov Models, In Thomas G. Dietterich, Suzanna Becker, and Zoubin Ghahramani, editors, *NIPS*, pp. 1173-1180. MIT Press, 2001.

D.Blei, J.Lafferty, Correlated Topic Models. In Y. Weiss, B. Scholkopf, and J. Platt, editors, *Advances in Neural Information Processing Systems 18*. MIT Press, Cambridge, MA, 2006.

A.Howard, T. Jebara, Dynamical Systems Trees. In *Proc. of Uncertainty in Artificial Intelligence*, 2004.

D.Husmeier. Discriminating Between Rate Heterogeneity and Interspecific Recombination in DNA Sequence Alignments with Phylogenetic Factorial Hidden Markov Models, *Bioinformatics*, 21 Supp. 12, Sep. 2005.

J.M.Andreoli, G.Bouchard, *Probabilistic Latent Clustering of Device Usage*, 6th Intl. Symposium on Intelligent Data Analysis, Madrid, Spain, 2005.

L.B.Almeida, Separating a Real-Life Nonlinear Image Mixture, *Journal of Machine Learning*, pp. 1199-1230, 2005.

\* cited by examiner

FACTORIAL HIDDEN MARKOV MODEL WITH DISCRETE OBSERVATIONS

BACKGROUND

The exemplary embodiment relates to the modeling of independent complex systems over time. It finds particular application in the detection of soft failures in device infrastructures and will be described with particular reference thereto. However, it is to be appreciated that the exemplary embodiment is also applicable to the modeling of other systems based on discrete observations.

There are many applications where it is desirable to decompose one or more complex processes, called observations, into a small set of independent processes, called sources, where the sources are hidden. The following tasks are of particular interest:

inference: given a sequence of observations and knowing the link between sources and observations, find the values of the sources that best fit what has been observed.

learning: given a large number of observations, find the link between sources and observations that best fits the observations.

One example of this problem is in an infrastructure of shared devices, such as a network of printers, where an administrator has the task of maintaining the shared devices in an operational state. Although some device malfunctions result in the sending of a message by the device itself, or result a catastrophic failure which is promptly reported by a user, other malfunctions, known as "soft failures" are not promptly reported to the administrator. This is because the device does not become unavailable, but rather suffers a malfunction, degradation, improper configuration, or other non-fatal problem. When a particular device undergoes a soft failure, the pattern of usage of the device often changes. Users who would typically use the device when it is functioning normally, tend to make more use of other devices in the network which provide a more satisfactory output. Since soft failures result in productivity losses and add other costs to the operators of the network, it is desirable to detect their occurrence promptly.

Statistical models, such as Hidden Markov Models (HMM) and Independent Component Analysis (ICA), have been used to model processes in which some variables are hidden, but are assumed to be statistically related to observed variables. The HMM makes certain assumptions, including that the values of the hidden variables (states) depend only upon previous values of the hidden variables, that the value of each hidden variable is independent of the values of the other hidden variables, and that the values of the observed variables depend only on the current values of the hidden variables. Under these assumptions, a time sequence of values of the hidden variables is inferred from the temporal variation of the observed variable values and knowledge of the parameters of the stochastic process relating the observed variables to the hidden ones. A known extension of the HMM approach is the factorial hidden Markov model (FHMM) described, for example, in Z. Ghahramani and M. I. Jordan, "Factorial Hidden Markov Models," in David S. Touretzky, Michael C. Mozer, and Michael E. Hasselmo, editors, *Advances in Neural Information Processing Systems*, volume 8, pp. 472-478 (MIT Press, 1996), hereinafter, "Ghahramani, et al."

In FHMM, exact inference has a complexity which is exponential in the number of hidden dynamics, and approximate inference techniques are generally required. Jordan and Ghahramani proposed a variational inference framework to estimate the parameters (See Ghahramani, et al., above, and Michael I. Jordan, Zoubin Ghahramani, Tommi S. Jaakkola, and Lawrence Saul, "An Introduction to Variational Methods for Graphical Models," in Michael I. Jordan, ed., *Learning in Graphical Models* (Kluwer Academic Publishers, Boston, 1998), hereinafter, "Jordan, et al."

Existing FHMM implementations generally operate on observed variables that are continuous. For example, the variational inference framework of Ghahramani, et al. is limited to continuous (Gaussian) observation variables. The hidden states, on the other hand, are assumed to be discrete, and the number of possible states for a given hidden dynamic is an input parameter to the FHMM analysis.

In many practical applications, however, the observed variables are also discrete, such as in the soft failure problem described above. It would be desirable to determine the printer states of printers of a digital network (the hidden parameters) based on observed choices of printer destination made by users (the observed parameters). Each choice of printer destination is a discrete observation limited to N discrete values where N is the number of available printers on the network. It would be advantageous if the set of usage observations could be employed to glean an understanding of the hidden underlying states of the devices in the network using a probabilistic model.

This problem is not limited to networked devices, such as printers, however, but is very general, since it applies to the analysis of any kind of processes producing sequential and high-dimensional discrete data, which must be decomposed into a smaller set of factors to be tractable.

Attempts to analyze FHMM with discrete observations have been less than fully satisfactory. While Jordan, et al. suggests that discrete observations may be accommodated using sigmoid functions, no algorithm is provided. The suggested approach of employing sigmoid functions, even if actually implementable, would have the disadvantage that the sigmoid functions are not well-representative of occurrences of (presumed) independent discrete events such as print job submissions. Other proposed approaches for accommodating discrete observations have been limited to discrete binary observations, and are not readily extendible to observations that can take three or more different discrete values.

There remains a need for an efficient model for solving the inference and learning tasks of FHMMs when the observations are discrete-valued, such as event counts.

INCORPORATION BY REFERENCE

The following references, the disclosures of which are incorporated herein in their entireties by reference, are mentioned.

U.S. Pub. No. 20060206445, published Sep. 14, 2006, entitled PROBABILISTIC MODELING OF SHARED DEVICE USAGE, by Jean-Marc Andreoli, et al., discloses methods for estimating parameters of a probability model that models user behavior of shared devices offering different classes of service for carrying out jobs. Parameters of the probability model are learned using the recorded job usage data, the determined range of service classes, and the selected initial number of job clusters.

U.S. Pub. No. 20060132826, published Jun. 22, 2006, entitled AUTOMATED JOB REDIRECTION AND ORGANIZATIONAL MANAGEMENT, by Ciriza et al., relates to a method for managing a plurality of communicatively coupled systems, such as printers, which includes collecting job log data and providing an automated print job redirection away from a malfunctioning printing device.

BRIEF DESCRIPTION

In accordance with one aspect of the exemplary embodiment, a method for analyzing a hidden dynamic includes acquiring discrete observations, each discrete observation having an observed value selected from two or more allowed discrete values. A factorial hidden Markov model (FHMM) relating the discrete observations to a plurality of hidden dynamics is constructed. A contribution of the state of each hidden dynamic to the discrete observation is represented in the FHMM as an observational parameter which scales at least one nominal parameter which is derived from a nominal distribution of the observations. States of the hidden dynamics are inferred from the discrete observations based on the FHMM. Information corresponding to at least one inferred state of at least one of the hidden dynamics is output.

In accordance with another aspect, a method for predicting states of sources in a system which includes a plurality of sources is provided. The method includes generating a model of the system in which each of a plurality of the sources may assume any one of a plurality of discrete hidden states at a given time, deriving parameters for training a variational expectation maximization algorithm based on discrete observations at a plurality of times, and applying the variational expectation maximization algorithm to a new set of discrete observations to infer the current state of at least one of the sources.

In accordance with another aspect of the exemplary embodiment, a system includes a plurality of shared devices, each of the devices capable of assuming a plurality of hidden states. A statistical analysis system acquires discrete observations for the plurality of devices and predicts hidden states of the plurality of devices based on the discrete observations. The statistical analysis system employs a factorial hidden Markov model (FHMM) which relates usage data with a plurality of states of the devices, the statistical analysis system inferring states of the devices from the discrete observations based on the FHMM and outputting information corresponding to at least one inferred state of at least one of the devices.

DETAILED DESCRIPTION

Figure 1:
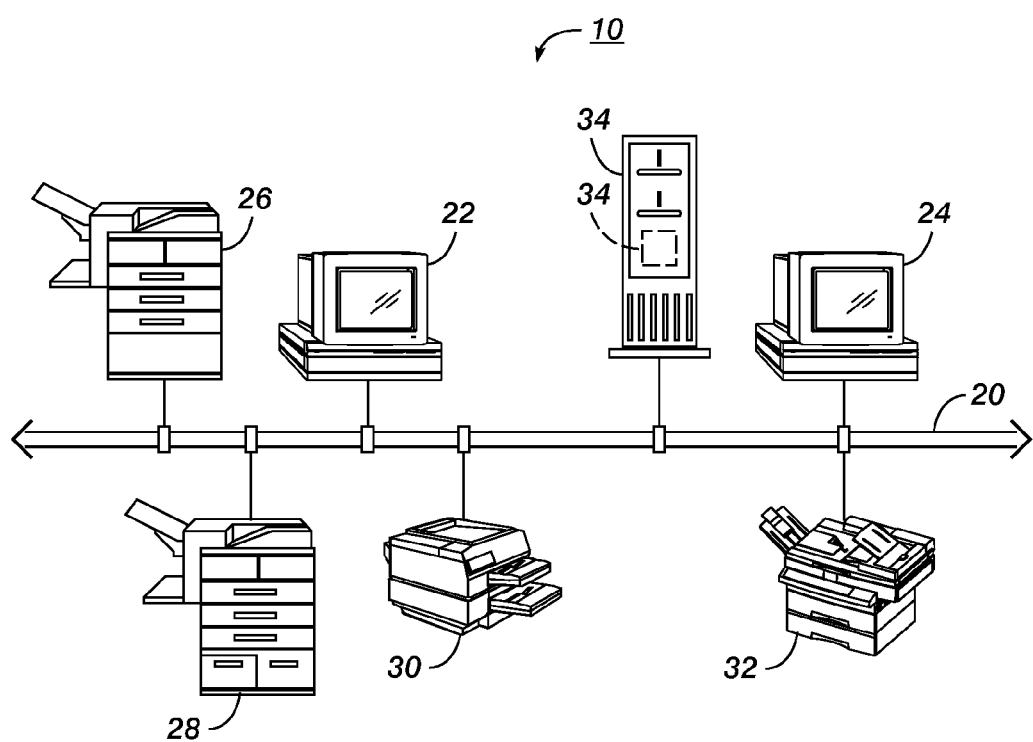
FIG. 1 illustrates exemplary networked printing system in which the exemplary method may be employed.

The exemplary embodiment relates to an apparatus and method in which statistical analysis of discrete observations provides useful information about underlying states of a system of interest. In various aspects, a Factorial Hidden Markov Model (FHMM) is used to model the system over time. The method employs inference and learning algorithms which allow the method to be scaled up to the analysis of several hundred independent dynamics and high-dimensional observations.

The exemplary embodiment provides algorithms for FHMM which allow modeling of systems with discrete observables. Using a sparse representation of the data, these algorithms are well adapted to high dimensional discrete data that arise in many applications. More generally, when dealing with multidimensional time series, many observations may be correlated or even redundant. One way to suppress these correlations is to identify independent factors, as in Principal Component Analysis. Such a reduced set of factors is easier to grasp by application experts and can be traced back to the process at hand and help better explain it. The exemplary method is also useful in the design of easy to grasp human-oriented visualizations of the data.

As used herein, a job is an interaction between a user and a device for carrying out a selected function (e.g., printing).

In one embodiment, the method is used in the analysis of device logs. These logs record jobs printed and a limited amount of information, such as the time, the identity of the user, and the identity of the device. The events in a group of shared devices can be logged and analyzed, in accordance with the method described herein, to provide a wealth of information about the behavior of the users which may be of benefit to designers and maintenance operators. A suitable model for explaining such logs is to consider that the users have a "nominal" behavior which is independent of time, and which is temporally modified by the combined effects of multiple independent dynamics capturing failure modes in components of the devices.

In one embodiment, the method is used for soft failure detection in device infrastructures. By "soft failure," it is meant that a device fails to operate properly, but this failure is observed through changes in usage patterns, rather than being reported by the device itself. A goal, in this embodiment, is to detect abnormal use of shared devices, such as printers and copiers, in an infrastructure such as an office. The abnormality can be due to a device failure, in which case several users may then switch from one device to another. Or it can be caused by a sudden change in user behavior, for example, when a user changes to a different office. A natural assumption is the independence of the device failures. The proposed algorithm scales up linearly with the number of hidden dynamics, so it can be applied to infrastructures involving hundreds of devices.

While the examples of the usefulness of the exemplary method focus on devices such as printers, it should be appreciated that the exemplary method is not limited to the particular applications described.

For example, FIG. 1 shows a simplified diagram showing one environment, namely a printing system 10, in which the embodiments described herein may operate. The environment may include a network 20 with an organization of shared network devices, printers in the exemplary embodiment. Existing on this network 20 are, for purposes of the embodiments, a plurality of computers 22 and 24, each of which is operated by a particular user, and a plurality of printers, 26, 28, 30, 32. Each of the printers may be, for example, a printer, a multifunction device (which provides two or more functions, such as scanning, printing, archiving, emailing, and faxing), or a standalone device such as digital copier, input scanner, or facsimile device. While five printers are shown by way of example, it is to be appreciated that there may be any number of devices, such as from two to several hundred. In the illustrated embodiment, a print server 34 acts as a virtual device to which all or some print requests on a network may be spooled before being sent to a physical device. In the embodiment shown in FIG. 1, the print server hosts a statistical analysis system 36, which analyzes logged usage data for later performing the operations shown in FIG. 3. As will be appreciated, the analysis system may be located elsewhere on the network 20, such as on a computer 22, 24 or at a location remote from the network.

In yet other embodiments, any one or more of the computers 22, 24 in FIG. 1 may be the computer of a systems administrator responsible for the activities of some or all of the printers on network 20. Such responsibilities may, for example, include making sure that a certain number of printers 26, 28, 30, 32 are available and operating on the network 20, making sure the printers on network 20 are of particular types, making sure that the installed printers are appropriately selected for the needs of the organization, making sure users are given an initial set of attributes for operating the printers, and making sure that in the event a printer becomes temporarily unavailable there are alternate printers identified to which print jobs destined to the unavailable printer may be redirected. In accordance with the embodiments disclosed herein, a system administrator may evaluate the printers available on the network of an organization and determine, based on the output of the statistical analysis system 36, whether one of the printers is likely to have experienced a soft failure and thus take corrective action, such as initiating a repair, redirection of print jobs, or the like. Or, such action may be initiated automatically by the statistical analysis system.

Depending on the embodiment in which the statistical analysis system 36 operates, discrete observations in the form of usage data may be recorded (or retrieved from one or more recording facilities) from any one or a combination of the printers and print server(s). In one embodiment, job usage data (typically counts) is retrieved from job log data recorded at the printers. In an alternate embodiment, recorded job usage data is a recorded job log data stored, for example, on a centralized job spooler or print server. In yet another embodiment, job usage data is accumulated individually by printers operating on the network through a distributed exchange of information (e.g., via a defined negotiation protocol). Observations on the user may be recorded (e.g., the user's network account on the computer 22, 24 from which the print job was sent).

While the exemplary embodiment is described in relation to a network of shared devices, such as printers, it is to be appreciated that the methods described are applicable to the prediction of underlying states of sources other than printers, based on discrete observations other than counts. By discrete observations, it is meant that the observations range over a countable set of values. Thus, unlike temperature, which is a continuously changing variable, counts, for example, are recorded intermittently, e.g., when a user decides to use a particular printer and may assume integral values, such as 0, 1, 2, 3, 4, etc, counts in a given time period.

Figure 2:
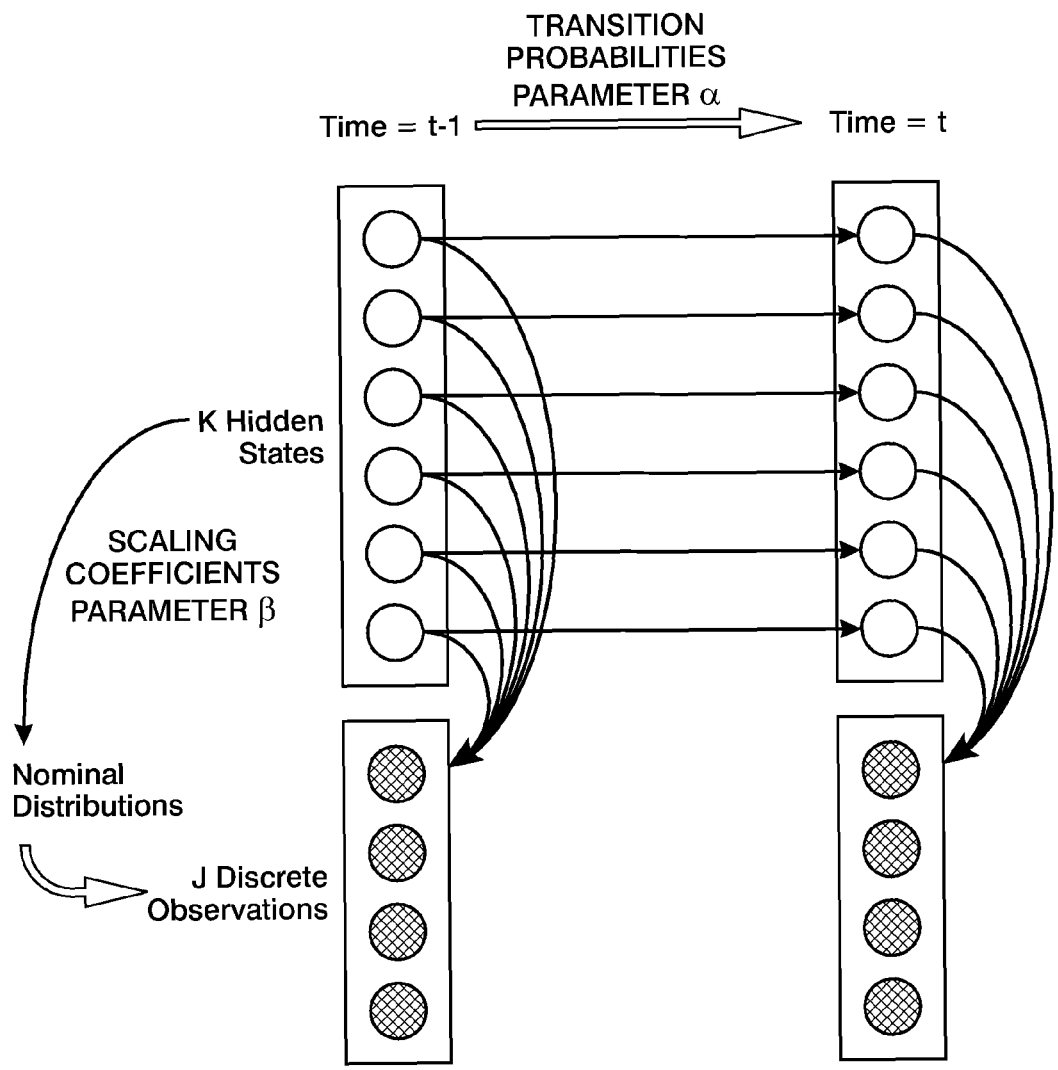
FIG. 2 illustrates transitions in an infrastructure, such as the networked printing system of FIG. 1, which includes K independent sources, each of which may at any given time assume a particular hidden state x.

FIG. 2 illustrates the problem to be solved. An infrastructure includes K independent sources (devices in the illustrated embodiment). It is assumed that each of the sources may at any given time assume a particular hidden state x from a finite set of L defined states. For example, in the case of printers these states may be defined as state (1) printer is functioning satisfactorily, and one or more states in which the printer is performing less than satisfactorily, such as state (2) printer is causing streaks, state (3) printer is printing in black and white but not color, and so forth. Of course, a printer may be defined as having a large number of different states, each representing failures of one or more of its components. Some of the sources may have more or less possible states than others. At a given time in the past (t−1), discrete observations are made on each of these sources, counts in the case of printers. Generally, these counts are sparse in that at any given time, only one of the devices may have a count 1 (e.g., a user selects a particular printer for printing) while other devices have a count zero. Alternatively, counts may be summed over predetermined time periods. A large amount of this historical data may be available, taken at various times. At current time t, which is some time after t−1, a new set of observations are made. During the intervening time, each of the K sources may have undergone a transition from one state to another state. The transitional dependencies between the states can be modeled using well known modeling techniques, such as a probability matrix, and the probability that a source is in a given state l knowing that the previous state is l' is generally assumed to be constant over time. One objective is to determine the likelihood that a source is in a particular state at time t, based on the much more limited set of observations during an interval including time t. As can be appreciated this combinatorial problem is exponential in the number of states and rapidly becomes intractable.

In the exemplary embodiment, an efficient algorithm is used to provide a maximum likelihood estimation of the parameters in a FHMM problem of the type illustrated in FIG. 2. In the exemplary embodiment, the parameters form a family $\beta_{jkl}$, which represents the contribution of the k-th source being in state l on the j-th observation, as described in greater detail below.

Figure 3:
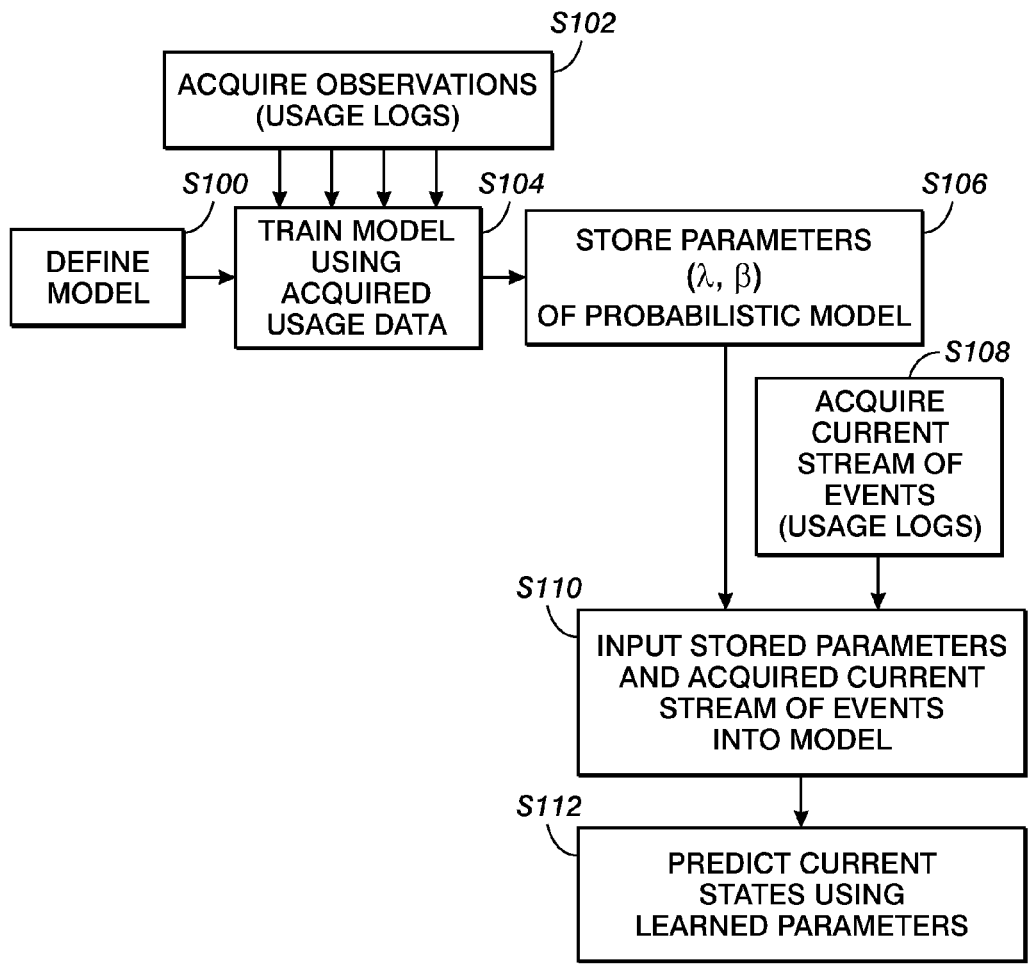
FIG. 3 is a flow diagram which illustrates an exemplary method for identifying hidden source information (such as information relating to soft failures) from discrete observations (such as usage logs)

FIG. 3 illustrates an exemplary method for identifying hidden source information (such as information relating to soft failures) from discrete observations (such as usage logs). The method includes defining a model of an infrastructure in which a set of sources operate (S100), acquiring discrete observations from the set of sources (device usage data) (S102) and using the acquired data for training a prediction algorithm by deriving parameters of the model (S104). The parameters of the model are stored (S106). At some time subsequent thereto, discrete observations are acquired, corresponding to a current stream of events from the same sources (S108). This data and stored parameters are input to the algorithm (S110). The trained prediction algorithm is used to infer (predict) the current state of one or more of the sources based on the current set of observations and the learned parameters (S112). The predicted current state may be output from the algorithm, and may be displayed to an operator, e.g., on the GUI of a computer in the network, output as a document file, printed on a network printer, stored for future analysis, or the like.

Development of a Statistical Model

The following description describes the development of a general model which may be used in the statistical analysis of discrete observations.

This section describes the aspects related to the operations for developing a model, as shown in FIG. 3. Parameters of the model defined at S100 are learned using the usage data recorded at S102. The details of operations performed are more fully described in the following sections below:

1. Model Definition (S100)

Every observed signal is denoted by $y=(y_1, \ldots, y_T)$ where T is the length of the observation sequence. An individual observation $y_t$ at time t is a J-dimensional vector containing discrete values which are usually counts of different types of events which occurred since the last observation. $y_{tj}$ denotes the value of the j-th feature at time t. It is assumed that these observations are generated by K sources. The state of all the sources is represented by $x_t=(x_{t1}, \ldots, x_{tk})$ where $x_{tk}$ is the state of the k-th source at time t.

1.1 Latent State Dynamic

First, it is assumed that the K sources are mutually independent, i.e.

$$p(x_1, x_2, \ldots, x_T) = \prod_{k=1}^{K} p(x_{1k}, x_{2k}, \ldots, x_{Tk})$$

where p is the joint probability distribution of all the states.

The k-th source is modeled by a Markov chain with initial proportions $P_k$ of size $L_k$ and a transition matrix $T_k$ of size $L_k \times L_k$, where $L_k$ is the number of possible states of the k-th dynamic. The distribution of $x_{tk}$ of the state of the k-th dynamic at time t is defined recursively as usual for Markov chains:

$$p(x_{1k}=l)=P_{kl} \tag{1}$$

$$p(x_{tk}=l'|x_{(t-1)k}=l)=T_{kll'} \tag{2}$$

1.2 Observation Distribution

For the observation probability, several choices are possible, depending on the application. Although the exemplary method is applicable to any distribution in the exponential family, a focus here is placed on multinomial and Poisson distributions, which arise naturally when the observations are event counts. For example, consider models where the natural parameters of the observation distribution at time t depend only on the states of the hidden dynamics $\{x_{t1}, \ldots, x_{tK}\}$ at time t. More precisely, given the states $l_1, \ldots, l_K$ of the K dynamics, it is assumed that the observation distribution is obtained from a known nominal distribution of the exponential class, which depends only on time, by applying multiplicative contributions, dependent on the different states $l_k$, to nominal parameters derived from the nominal distribution. Thus, each dynamic contributes to amplify or, on the contrary, attenuate the effects of the nominal parameters on the observed counts. The contribution of the k-th dynamic being in state l on the j-th observation is captured by a single scalar observational parameter $\beta_{jkl}$. Multinomial and Poisson cases may be treated as follows. However, it should be noted that the two cases lead to similar equations and can be cast into the same algorithm, as outlined in further detail below.

Poisson Observations:

In this case, it is assumed that the j-th discrete variable $y_{tj}$ at time t is sampled from a Poisson distribution with nominal parameter (here, the mean of the distribution) $\lambda_{tj}$, so that the actual parameter is:

$$\tilde{\lambda}_{tj}(\ell_1, \ldots, \ell_K) = \lambda_{tj} \exp\left(\sum_{k=1}^{K} \beta_{jk\ell_k}\right) \tag{3}$$

It may further be assumed that, conditionally to the states of the hidden dynamics, the J discrete variables $y_{tj}$ are independent. The overall observation distribution is therefore given by:

$$p(y|x, \beta) = \prod_{t=1}^{T} \prod_{j=1}^{J} \frac{1}{y_{tj}!} \tilde{\lambda}(x_t)^{y_{tj}} \tag{4}$$

Multinomial Observations:

In this case, it is assumed that the sum $n_t = \Sigma_{j=1}^{J} y_{tj}$ of the discrete variables $y_{tj}$ is a global count which is known at each time, and that each $y_{tj}$ represents a contribution to that count (hence they are not independent). The overall nominal observation distribution is assumed to be a multinomial distribution with parameters $p_{tj}$, so that the actual parameters are:

$$\tilde{p}_{tj}(\ell_1, \ldots, \ell_K) \propto p_{tj} \exp\left(\sum_{k=1}^{K} \beta_{jk\ell_k}\right) \tag{5}$$

(the proportionality coefficient is given by the intrinsic constraint that the probabilities sum to one). Hence the overall observation distribution is:

$$p(y|x, \beta) = \prod_{t=1}^{T} \frac{n_t!}{\prod_{j=1}^{J} y_{tj}!} \prod_{j=1}^{J} \tilde{p}_{tj}(x_t)^{y_{tj}} \tag{6}$$

1.3 The Generative Model

To summarize, the parameters of the model are:
(i) The initial proportions and transition matrix of the hidden dynamics:

$$\alpha = \{P_{kl}, T_{kll'}\} k \in \{1, \ldots, K\} ll' \in \{1, \ldots, L_k\}$$

where $\alpha$ represents a transitional parameter which relates to a probability that a source is in a given state at a first time (t), knowing its state at a second time (t−1) prior to the first time.

(ii) The individual additive contributions of the hidden states which define the observation distribution:

$$\beta = \{\beta_{jkl}\} j \in \{1, \ldots, J\} k \in \{1, \ldots, K\} l \in \{1, \ldots, L_k\}$$

where $\beta$ represents an observational parameter: the contribution of the k-th source being in state l on the j-th observation. Note that because parameters $\beta_{jkl}$ appear as argument of an exponential function, their effect is multiplicative. If $\beta_{jkl}$ is null, the k-th dynamic, when in state l, has no effect on the distribution of the j-th observation; if it is positive, the effect is to multiplicatively increase the corresponding parameter of that distribution, while if it is negative, the effect is a reduction.

2. Inference (S110)

Inference aims at finding the conditional distributions $p(x|y, \beta, \alpha)$ of the hidden variables x knowing the model parameters $(\alpha, \beta)$ and the observations y. The computation of this distribution, although theoretically possible using general inference methods such as the Forward-Backward algorithm (as described, for example, in C. M. Bishop, PATTERN RECOGNITION AND MACHINE LEARNING (Springer, 2006)), becomes exponentially expensive as the number of hidden dynamics grows. For problems involving large values of K, for example, K>10, an exact computation may be computationally too expensive. Approximations can be obtained by aiming at a "projection" of the target distribution on a computationally tractable subspace $\mathcal{Q}$ of the space of all possible FHMM distributions. Formally, this projection is defined as the distribution in $\mathcal{Q}$ which is closest to the target one by the Kullback-Leibler divergence KL. The problem is therefore decomposed into two steps: (i) choice of the subspace $\mathcal{Q}$ and (ii) resolution of the following optimization problem.

$$\min_{q \in Q} KL(q(x) \| p(x|y, \alpha, \beta)) \quad (7)$$

If $\mathcal{Q}$ contains the target distribution p(x|y,α,β), then the solution to the above problem is exact (the Kullback-Leibler divergence KL equals 0). The choice of subspace $\mathcal{Q}$ therefore implies a trade-off between tractability of the optimization problem (7) and complexity of the subspace in the overall space of possible distributions. $\mathcal{Q}$ may be chosen to be itself the space of independent Markov chains, i.e. $q \in \mathcal{Q}$ if and only if:

$$q(x) = \prod_{k=1}^{K} q_{1k}(x_{1k}) \prod_{t=2}^{T} q_{tk}(x_{tk}|x_{(t-1)k}) \quad (8)$$

Figure 9:
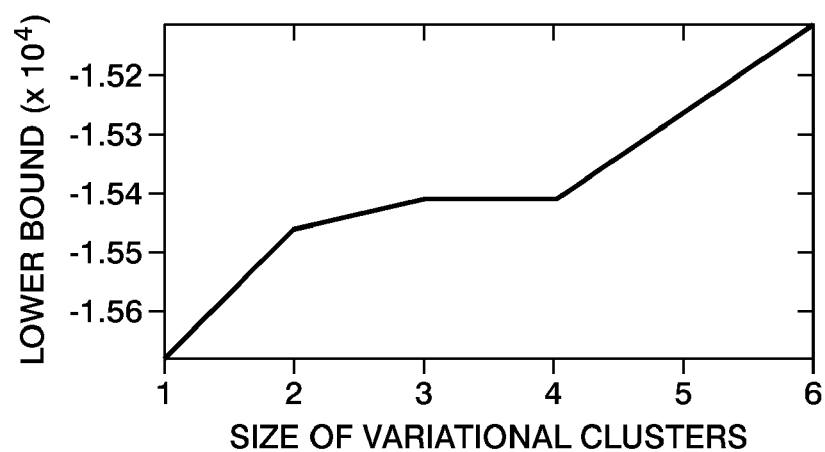
FIG. 9 shows the value of the objective function for different sizes of the variational clusters.

This choice may be viewed as a crude approximation of the posterior. Better approximations can be obtained by clustering together some of the Markov chains, and observing that a cluster of Markov chains is equivalent to a single one in higher dimension. Exact computation corresponds to the case where all the chains are clustered into a single one. A tradeoff between the quality of the approximation and the dimensionality (hence complexity) of the problem can be obtained by varying the number of clusters, as observed in, for example, E. Xing, M. Jordan, and S. Russell, A GENERALIZED MEAN FIELD ALGORITHM FOR VARIATIONAL INFERENCE IN EXPONENTIAL FAMILIES, in *Proc. of the 19th Annual Conf. on Uncertainty in AI* (2003). The algorithms below are given for the fully factorized case (i.e. one chain per cluster), but would work just as well with intermediate levels of clustering (as illustrated in FIG. 9).

Using Bayes law and the factorial decomposition in $\mathcal{Q}$, it is easy to transform the minimization problem (7) into the maximization of the following quantity:

$$\mathcal{F}_0 = E_q[\log p(y|x, \beta)] + E_q[\log p(x|\alpha)] + H(q) \quad (9)$$

$$= E_q[\log p(y|x, \beta)] - \sum_{k=1}^{K} KL(q(x^k) \| p(x^k|\alpha))$$

which lower bounds the likelihood log p(y|α, β) (see, for example, Jordan, et al.). The solution to this maximization problem is given below in section 4 and results in Algorithm 4.1. In the general case, in the prediction step, both α and β are assumed known. For the learning stage (described below), β is assumed unknown and is computed by a standard expectation maximization loop which uses the predictive algorithm based on the current estimate of β at each occurrence of the loop.

Algorithm 4.1

Initialisation $$\begin{cases} \mathcal{F} \leftarrow -\infty \\ \gamma_{t\ell}^{(k)} \leftarrow \frac{1}{L_k} \; \forall \, k, t, \ell \\ u_{tj}^{(k)} \leftarrow \sum_{\ell=1}^{L_k} \beta_{jk\ell} \gamma_{t\ell}^{(k)} \; \forall \, k, t, j \\ p_{tj} \leftarrow y_{tj} \prod_{k=1}^{K} u_{tj}^{(k)} \; \forall \, t, j \\ \varphi_t \leftarrow 1 \; \forall \, t \end{cases}$$

repeat $$\begin{cases} \text{for } k \leftarrow 1 \text{ to } K \\ \text{do} \begin{cases} p_{tj} \leftarrow \frac{p_{tj}}{u_{tj}^{(k)}} \; \forall \, t, j \\ o_{tk\ell}^{(k)} \leftarrow \sum_{j=1}^{J} y_{tj} \beta_{jk\ell} - \varphi_t \sum_{j=1}^{J} p_{tj} \exp \beta_{jk\ell} \; \forall \, t, \ell \\ \gamma^{(k)}, \kappa^{(k)} \leftarrow FORWARDBACKWARD(o^{(k)}, \alpha^{(k)}) \\ u_{tj}^{(k)} \leftarrow \sum_{\ell=1}^{L_k} \beta_{jk\ell} \gamma_{t\ell}^{(k)} \; \forall \, t, j \\ p_{tj} \leftarrow p_{tj} u_{tj}^{(k)} \; \forall \, t, j \\ \varphi_t \leftarrow \left( \sum_{j=1}^{J} p_{tj} \right)^{-1} \; \forall \, t \end{cases} \\ \mathcal{F}_{old} \leftarrow \mathcal{F} \\ \mathcal{F} \leftarrow \sum_{k=1}^{K} \sum_{t=1}^{T} \sum_{j=1}^{J} \sum_{\ell=1}^{L_k} y_{tj} \beta_{jk\ell} \gamma_{t\ell}^{(k)} + \sum_{t=1}^{T} \log \varphi_t - \sum_{k=1}^{K} \kappa^{(k)} \end{cases}$$

until $|\mathcal{F} - \mathcal{F}_{old}| < \varepsilon$ return $(\gamma, \mathcal{F})$ It may be noted that the two cases for the observation distribution (Poisson or multinomial) are amenable to the same treatment. In fact, the exact computation of $E_q[\log p(y|x, \beta)]$ in $\mathcal{F}_0$ is only feasible with the Poisson observations model.

In the multinomial observations case, an additional variable parameter φ is introduced, together with a lower bound $\mathcal{F}$ of $\mathcal{F}_0$ dependent on φ, so that the inference problem becomes the maximization of the lower bound $\mathcal{F}$ according to q and φ. In both cases, the maximum of the objective function (either $\mathcal{F}$ or $\mathcal{F}_0$) is found using a component wise maximization procedure along the components $q_k$ of q, each of these maximization subproblems being solved by a Forward-Backward algorithm, as described, for example, in Ghahramani and Jordan: for every dynamic k, the function FORWARDBACKWARD(O, α) takes as input the observation conditional log-probabilities $o^{(k)}$ and the Markov chain parameters $\alpha_k$, and returns the individual expectations $\gamma_{tkl} = E_{q_k}[x_{tkl}]$ as well as the marginal log-likelihood $\kappa_k$. More details can be found in Section 4.

Scalability: Let $\tilde{L}=\max_k L_k$ be the maximum size of the state range of the hidden dynamics, and $$p = \frac{1}{TJ}\sum_{t=1}^{T}\sum_{j=1}^{J} I_{\{y_{tj}\neq 0\}}$$

the proportion of non-zero elements in the data, each step of the predictive algorithm has a complexity of $O(T\tilde{L}^2 Kp)$ and requires $O(T\tilde{L}Kp)$ memory units. Note here the importance of dealing with sparsity: given the dimensions involved, manipulating full matrices would be unfeasible.

3. Learning (S104)

When β is unknown, an estimate of the Maximum A Posteriori (MAP) value can be obtained by maximizing the objective function ($\mathcal{F}_0$ or $\mathcal{F}$) with respect to β. This corresponds to the Variational EM algorithm where the E step at each occurrence of the EM loop is computed by the algorithm of the previous section using the current estimate of β and the M-step updates the estimate of β using a conjugate gradient method, since the gradient of the objective can be computed easily.

These methods assume that the number of dynamics and the (finite) state space of each of them are known a priori. If this is not the case, they can always be learnt by experimenting with different values and selecting one by cross-validation on the likelihood.

Having given an overview of the processing with respect to FIG. 3, a more detailed discussion of the generation of the model is provided below.

4. Generation of the Algorithm (S100)

To simplify notation, indicator vectors are used to represent the state variables $x_t = (x_{t1}, \ldots, x_{tk})$. Defining $S_L = \{v \in \{0,1\}^L, \Sigma_{l=1}^{L} v_l = 1\}$, every state variable $x_{tk} \in S_{L_k}$ is in fact represented as a vector that can take one of the $L_k$ different values in $S_{L_k}$. Take $x_{tkl}$ (which ranges over $\{0,1\}$) to denote the l-th component of $x_{tk}$ viewed as an indicator vector. In other words, $x_{tkl} = I_{\{x_{tk}=l\}}$. Here, and in the sequel, $I_{\{P\}}$ is defined as 1 if property P holds and 0 otherwise.

4.1 Hidden State Dynamic

With the indicator vector notation, the probability distribution of the state of the k-th chain given by (1) and (2) can be rewritten as:

$$p(x_{1k}|\alpha) = \prod_{\ell=1}^{L_k} P_{k\ell}^{x_{1k\ell}}$$

$$p(x_{tk}|x_{(t-1)k}, \alpha) = \prod_{\ell=1}^{L_k}\prod_{\ell'=1}^{L_k} T_{k\ell'\ell}^{x_{(t-1)k\ell'} x_{tk\ell}}$$

The joint probability of the hidden state is therefore:

$$p(x|\alpha) = \prod_{k=1}^{K} p(x_{1k}|\alpha) \prod_{t=2}^{T} p(x_{tk}|x_{(t-1)k}) \quad (10)$$

$$= \prod_{k=1}^{K}\left(\prod_{\ell=1}^{L_k} P_{k\ell}^{x_{1k\ell}}\right)\left(\prod_{t=1}^{T}\prod_{\ell=1}^{L_k}\prod_{\ell'=1}^{L_k} T_{k\ell'\ell}^{x_{(t-1)k\ell'} x_{tk\ell}}\right)$$

Figure 4:
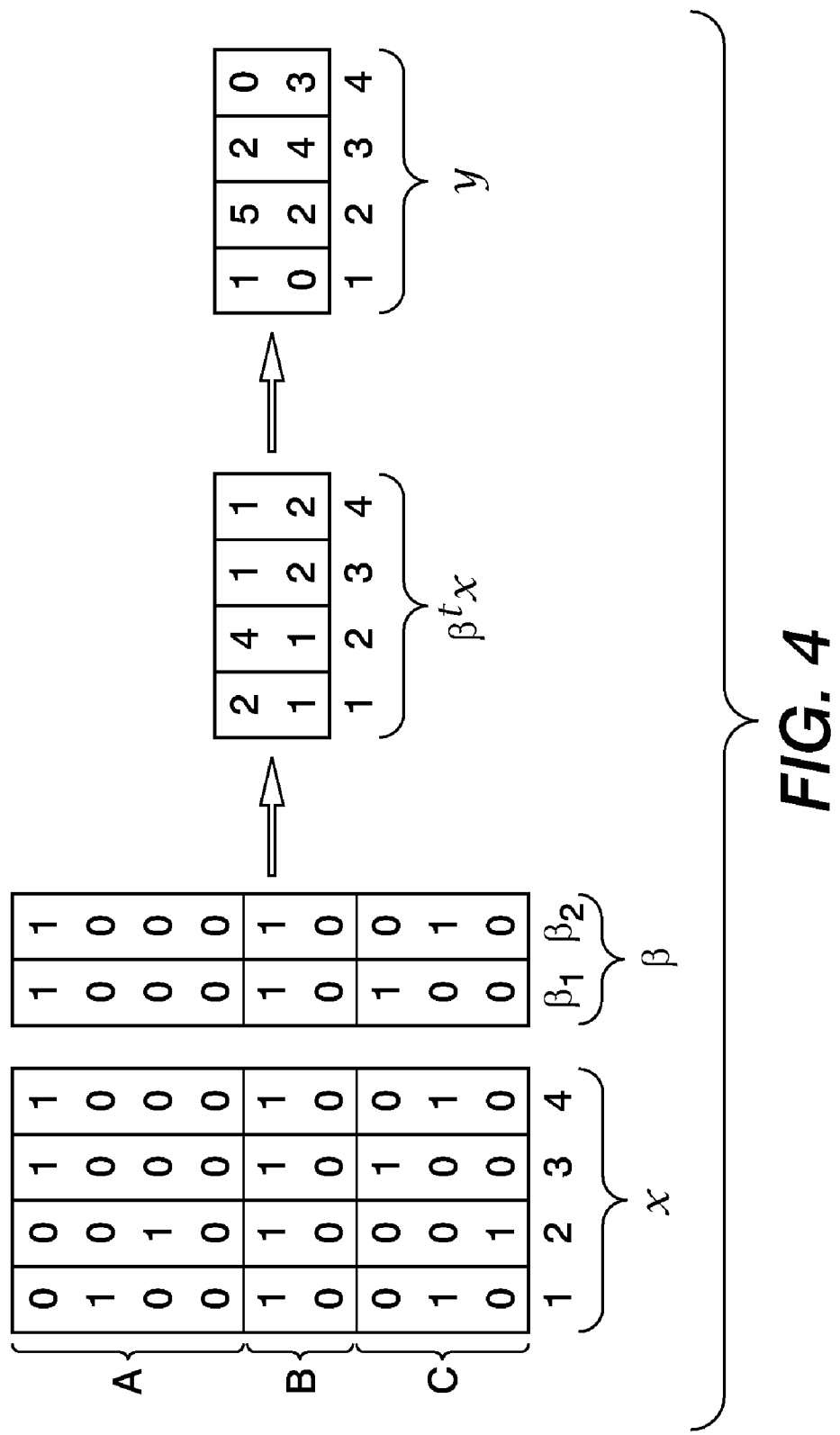
FIG. 4 illustrates a state representation for a simplified system with three hidden dynamics A, B, C each with a number of discrete states: $L_1=4$ (i.e., 4 discrete states), $L_2=2$ and $L_3=3$, respectively.

In the Table shown in FIG. 4, an example of the state vector notation is given in the array on the lefthand side (captioned x). Examples of state values are given in the first array (the columns are successive timestamps, the $L_1+L_2+L_3=9$ rows are the states in index vector notation), observation parameter β is given in the second array, the contribution of this parameter to the resulting Poisson intensities is given in the third array, and a sample final observation is shown in the fourth.

There are 4 time instants (represented by columns) and three dynamics (sources) A, B, C. Source A can be in any one of four states, represented by rows 1-4, source B can be in any one of two states, represented by rows 5-6, and source C in any one of three states, represented by rows 7-9. The initial state of the first source is $x_{11}=(0,1,0,0)$, which means that it is in the state 2 (out of 4 possibilities). Similarly, the second dynamic is initially in the state 1 (out of 2 possibilities).

4.2 Observations Distribution

The middle array of the table in FIG. 4 (captioned β) gives an example of the β parameter. Following the indicator notation, the parameters $\beta_{jkl}$ are represented in a two dimension matrix, the j-th column of which is obtained by concatenating (vertically) the vectors $(\beta_{jkl})_{l=1}^{L_k}$ for each k=1, ..., K. The advantage of this notation is that the natural parameters of the observation distributions given by (3) and (5) can now be formulated as simple dot-products:

Poisson Case:

$$\tilde{\lambda}_{tj}(x_t) = \lambda_{tj} \exp(\beta_j' x_t)$$

Multinomial Case:

$$\tilde{p}_{tj}(x_t) \propto p_{tj} \exp(\beta_j' x_t)$$

The result of these dot-products are illustrated in the third array of the Table in FIG. 4. A random drawing of the observation distribution (Poisson case) corresponding to the parameters of the example is finally shown in the last array of Table 1. In the Poisson case, the nominal mean $\lambda_{tj}$ is usually proportional to the length $\Delta_t$ of the real time interval in which the events have been recorded. It is indeed natural to assume that the event counts be proportional to $\Delta_t$ (the longer you wait the more events are recorded). For simplicity sake, in the sequel, it is assumed, without loss of generality, that $\lambda_{tj} = \Delta_t$. In the multinomial case, the cumulated sum of the observations is known and implicitly contains the information about the real length of the observation interval. For simplicity sake, it can be assumed that. $p_{tj} \propto 1$, i.e. is constant over time and uniform.

4.3 Derivation of the Algorithm (S110)

An exemplary method for evaluation of $E_q[\log p(y|x, \beta)]$ in the maximization problem (9) is set forth in this section.

4.3.1 Poisson Case

In the case of Poisson observations, the quantity $E_q[\log p(y|x, \beta)]$ can be computed exactly:

$$E_q[\log p(y|x, \beta)] =$$

$$\sum_{t=1}^{T}\sum_{j=1}^{J}\sum_{k=1}^{K}\sum_{\ell=1}^{L_k} y_{tj}\beta_{jk\ell} E_{q_k}[x_{tk\ell}] - \sum_{t=1}^{T}\Delta_t \sum_{j=1}^{J}\prod_{k=1}^{K}\left(\sum_{\ell=1}^{L_k} E_{q_k}[x_{tk\ell}] e^{\beta_{jk\ell}}\right)$$

4.3.2 Multinomial Case

In the case of multinomial observations, the implicit dependency between observations due to the constraint on their sum makes the computation harder:

$$E_q[\log p(y|x, \beta)] = \sum_{t=1}^{T} \sum_{j=1}^{J} E_q[\beta_j^t x_t y_{tj}] - \sum_{t=1}^{T} n_t E_q\left[\log\left(\sum_{j=1}^{J} e^{\beta_j^t x_t}\right)\right]$$

The expectations in the first sum are $E_q[\Sigma \beta_{jk}^t x_{tk} y_{tj}] = y_{tj} \Sigma_{k=1}^{K} \beta_{jk}^t \gamma_{tk}$. The expectations in the second sum have an exponential number of terms, but the fact that the logarithm is a concave function can be used to define a lower bound $\mathcal{F}_0$. A Taylor expansion of the logarithm at point $n_t/\phi_t$ gives:

$$\log\left(\sum_{j=1}^{J} e^{\beta_j^t x_t}\right) \leq \log\frac{n_t}{\varphi_t} - 1 + \frac{\varphi_t}{n_t} \sum_{j=1}^{J} e^{\beta_j^t x_t} \quad (11)$$

where the non-negative scalars $\phi_t$ are additional variable parameters. Their values will be optimized to maximize the lower bound:

$$E_q[\log p(y|x,\beta)] \geq \sum_{t=1}^{T} \log\varphi_t + \sum_{t=1}^{T} \sum_{j=1}^{J} \sum_{k=1}^{K} \sum_{\ell=1}^{L_k} y_{tj} \beta_{jk\ell} E_{q_k}[x_{tk\ell}] - \quad (12)$$

$$\sum_{t=1}^{T} \varphi_t \sum_{j=1}^{J} \prod_{k=1}^{K} \left(\sum_{\ell=1}^{L_k} E_{q_k}[x_{tk\ell}] e^{\beta_{jk\ell}}\right) + C$$

where $$C = \sum_t n_t - \sum_t \log n_t + \sum_t \log\Gamma(1+n_t) - \sum_{t,j} \log\Gamma(1+y_{tj})$$

4.3.3 The Algorithm

Referring back to section 4.1, note that the multinomial and the Poisson cases have very similar forms. In the following, both approaches are merged by considering that for every $t$, $\Delta_t = \phi_t$. For multinomial observations, the values $\phi_t$ are estimated by maximizing $\mathcal{F}$ and for Poisson observations, they are given a priori. The lower bound $\mathcal{F}$ has the following form:

$$\mathcal{F} = \sum_{t=1}^{T} \sum_{j=1}^{J} \sum_{k=1}^{K} \sum_{\ell=1}^{L_k} y_{tj} \beta_{jk\ell} E_{q_k}[x_{tk\ell}] - \quad (13)$$

$$\sum_{t=1}^{T} \varphi_t \sum_{j=1}^{J} \prod_{k=1}^{K} \left(\sum_{\ell=1}^{L_k} E_{q_k}[x_{tk\ell}] e^{\beta_{jk\ell}}\right) +$$

$$\sum_{t=1}^{T} \log\varphi_t + C - \sum_{k=1}^{K} KL(q_k(x) \| p_k(x|\alpha))$$

This function is maximized using a coordinate ascent algorithm. If the terms depending on the kth chain are isolated, the lower bound is:

$$\mathcal{F} = \sum_{t=1}^{T} \sum_{\ell=1}^{L_k} o_{tk\ell} E_{q_k}[x_{tk\ell}] - KL(q_k(x) \| p_k(x|\alpha)) + c_k \quad (14)$$

where $$o_{tkl} = \sum_{j=1}^{J} y_{tj} \beta_{jk\ell} - \varphi_t \sum_{j=1}^{J} e^{\beta_{jk\ell}} \prod_{k' \neq k} \left(\sum_{\ell=1}^{L_{k'}} E_{Q_{k'}}[x_{tk'\ell'}] e^{\beta_{jk'\ell'}}\right) \quad (15)$$

and $$c_k = \sum_{k' \neq k} \sum_{t=1}^{T} \sum_{j=1}^{J} \sum_{\ell=1}^{L_{k'}} y_{tj} \beta_{jk'\ell'} E_{Q_{k'}}[x_{tk'\ell'}] + \quad (16)$$

$$\sum_{t=1}^{T} \log\varphi_t + C - \sum_{k' \neq k} KL(q_{k'}(x) \| p_{k'}(x|\alpha))$$

A maximization of (13) relative to $q_k$ can be performed using the Forward-Backward algorithm for HMM. The values of the matrix $O_k = \{O_{tkl}\}$ corresponds to the log-probability of the $t^{th}$ observation if $x_{tk}$ is in state l. All these steps are summarized in the predictive algorithm which take as input the observations y, the Markov chain parameters $\alpha$, the weights $\beta$ and the tolerance on the stopping rule defined as a scalar $\epsilon > 0$.

Without intending to limit the scope of the exemplary embodiments, the following example demonstrates the effectiveness of the exemplary algorithm.

EXAMPLE 1

Application to Soft Failure Detection

In this application, usage logs are observed in a print infrastructure such as an office where multiple devices are offered for shared use to a set of users.

The observed variables are pairs $(u_t, d_t)_{t=1, \ldots, T}$, where $u_t$ denotes the user who invoked the t-th job (ranges over $\{1, \ldots, N_u\}$) and $d_t$ denotes the device in that job (ranges over $\{1, \ldots, N_d\}$).

It is assumed that the stochastic matrix $\pi_{ij}$ of user print profiles is given, where $\pi_{ij}$ is the nominal probability that user i will use device j prior to any knowledge about the state of the devices.

It is assumed that at each job t, each device j is in a state $s_{tj} \in \{1, \ldots, L_j\}$, and that for each state, $l \in \{1, \ldots, L_j\}$, the confidence attributed by the users to a device known to be in state l is captured by a coefficient $0 < \alpha_{jl} \leq 1$. More precisely, the probability that user i chooses device j knowing all the device states at the time of job t is obtained from the nominal probability of i choosing j (prior to the knowledge of the states) multiplied by the confidence coefficient attached to the state of j:

$$p(d_t=j | u_t=i, s_t) \propto a_{s_{tj}} \pi_{ij}$$

the coefficient of the proportionality being chosen so that the probabilities sum to 1.

There are $J = N_d$ observed counts defined by $y_{tj} = I_{\{d_t = j\}}$ where 1 is as defined in section 4.0 above. Note that by construction, $\Sigma_{j=1}^{J} y_{tj} = 1$, so the multinomial observation distribution model is applicable, with $n_t = 1$. [see 0047]

There are $K = N_d + 1$ dynamics defined by:

$$x_t = (s_{t1}, \ldots, s_{tN_d}, u_t)$$

The first $N_d$ components represent the hidden states of the devices. The last component represents the user chosen at each job. This introduces a slight variation with respect to the framework described above, where it was assumed for simplicity sake that all the dynamics were hidden. It would have been straightforward to account for observed dynamics. In practice, in Algorithm 4.1, the component wise maximization for the observed dynamics can be skipped.

With these assumptions, it can be seen that, upon one single job, the vector of job counts on the different devices given the device states and selected user follows a multinomial distribution:

$$p(y|x, a, \pi) = \prod_{t=1}^{T} \prod_{j=1}^{J} \left( \frac{\pi_{u_t j} a_{s_j}}{\sum_{j'=1}^{J} \pi_{u_t j'} a_{s_{j'}}} \right)^{y_{tj}}$$

which corresponds to Eqn. 6. Matching the parameters of the multinomial with Eqn. 5, then, for j=1, ..., J:

$$p_{tj} = \frac{1}{J} \text{ (nominal value)}$$

$$\beta_{jk\ell} = I_{\{k=j\}} a_\ell \text{ for } 1 \leq j < K \text{ (device states)}$$

$$\beta_{jKi} = \log \pi_{ij} \text{ (user)}$$

Without intending to limit the scope of the exemplary embodiment, FIGS. 5-9 illustrate the application of the algorithm to simulated data. The data is simulated according to the algorithm for Poisson distributions 1.3.1. The number of dynamics (7) and their state ranges ({1,2}) are assumed to be known. From that and the simulated data, the parameters α and β are recovered as well as the values of the states at the different times. Different clusterizations of the dynamics have been tried.

Figure 5:
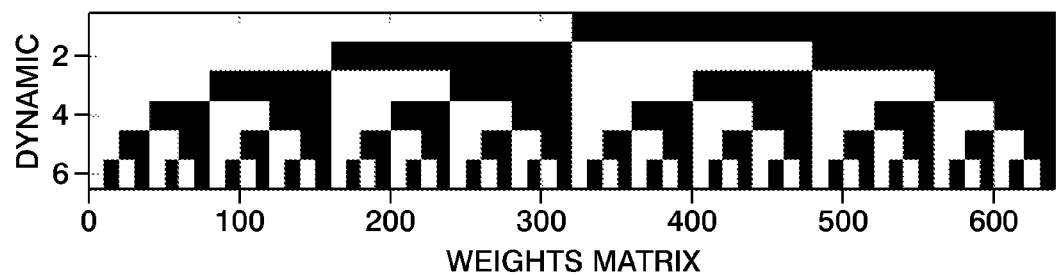
FIG. 5 shows a simulated plot for seven dynamics (sources) over time, each source having two states.
Figure 6:
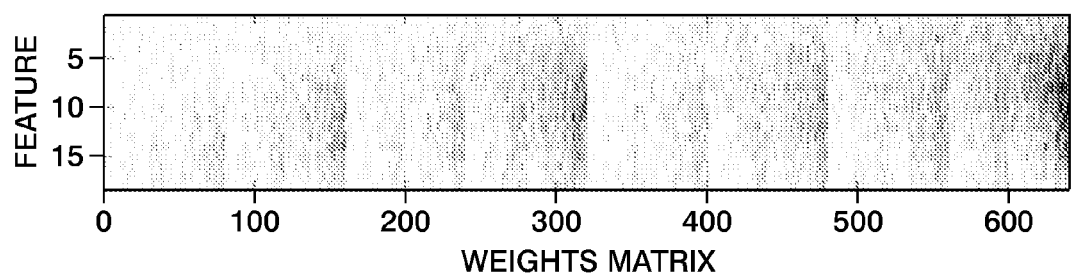
FIG. 6 shows observations simulated by drawing twenty counts from weighted Poisson distributions.
Figure 7:
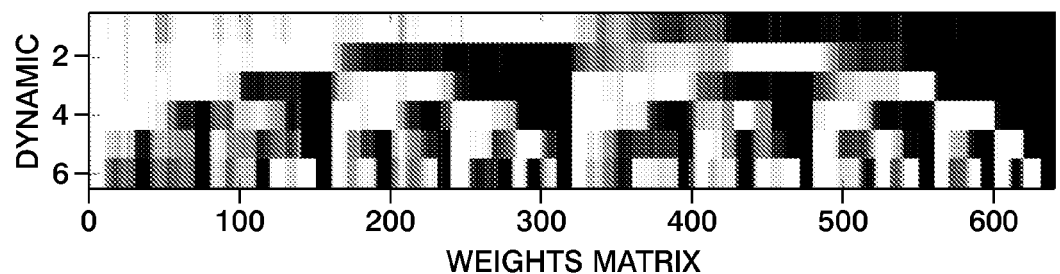
FIG. 7 shows the seven dynamics as reconstructed by the exemplary system from the simulated observations.
Figure 8:
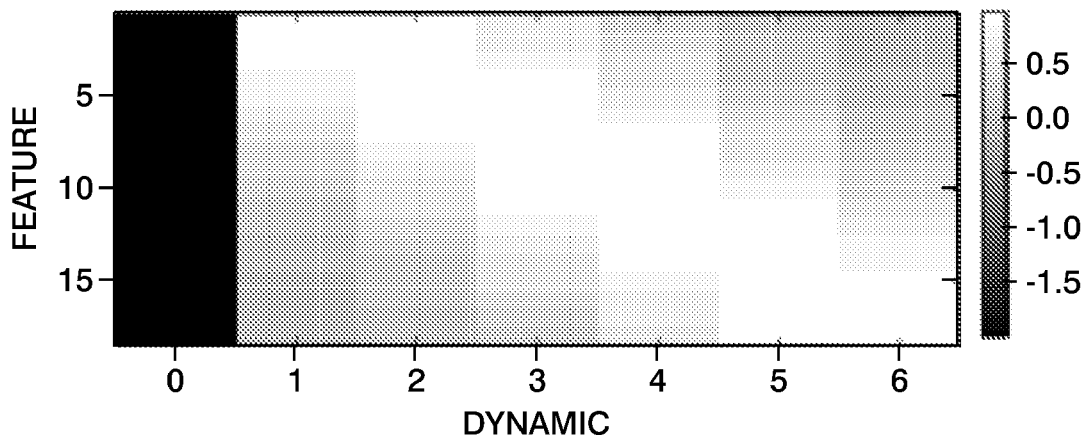
FIG. 8 shows weights used in generating the observations in FIG. 6.

FIG. 5 shows a plot for seven dynamics (sources) over time. The sources are simulated to alternate between state 1 (white) and 2 (black) at frequency 1, 2, 4, 8, 16, 32, and 64, respectively. FIG. 6 shows observations simulated by drawing twenty counts from Poisson distributions with mean obtained from a nominal one multiplied by weights specified in the plot in FIG. 8 (only matrix $\beta_{jk2}$ is shown: $\beta j_{k1}$=1). FIG. 7 shows the seven dynamics as reconstructed by the exemplary system from the simulated observations. FIG. 9 shows the value of the objective function for different sizes of the variational clusters.

The simulated results demonstrate that the inference problem (guessing the state of the devices by observing their usage) is an instance of the approach developed in the previous sections and that useful predictions can be made as to the state of a device over time.

5. Extensions

FHMM are not limited to chains but can also be defined for Gaussian processes (see e.g. A. Howard and T. Jebara. Dynamical systems trees. In *Proc. of Uncertainty in Artificial Intelligence*, 2004). The present focus on Markov chains is only due to our target applications, which deal with time-series of non differentiable observations (typically, failures). Discrete states for the hidden dynamics are assumed in the illustrated examples. A continuous dynamic can also be used, for example by approximating a continuous dynamic using Markov chains with multiple leveled states. In one embodiment, it is contemplated that the method may mix both continuous and discrete dynamics in a Factorial switching Kalman filter to efficiently model continuous processes, such as aging or graceful degradation of systems, together with discrete processes such as working or non-working operation modes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for analyzing a hidden dynamic of a set of sources in an infrastructure, the method comprising:
    with a computer, acquiring discrete observations from a set of sources of the observations, each discrete observation having an observed value selected from two or more different discrete values;
    constructing a factorial hidden Markov model (FHMM) relating the discrete observations to a plurality of hidden dynamics of the set of sources, wherein each of the hidden dynamics is able to assume any one of a number of states at a time, a contribution of the state of each hidden dynamic to the discrete observation being represented in the FHMM as an observational parameter which scales at least one nominal parameter which is derived from a nominal distribution of the observations, including deriving the parameters of the model by training a variational expectation maximization algorithm; and
    inferring states of the hidden dynamics from the discrete observations based on the FHMM, including applying the variational expectation maximization algorithm to a new set of the discrete observations by an approximation based on minimizing the Kullback-Leibler (KL) divergence between a true conditional distribution of the parameters and hidden states given the observations and a set of target distributions where the parameters and hidden states are forced to be independent; and
    outputting information corresponding to at least one inferred state of at least one of the hidden dynamics corresponding to a hidden state of one of the sources in the set of sources.

2. The method of claim 1, wherein the constructing comprises:
    constructing the FHMM where, at each considered time, the discrete observations are assumed to be sampled from independent Poisson distributions whose observational parameters are obtained from the nominal parameters scaled by contributions from the states of the hidden dynamics.

3. The method as set forth in claim 1, wherein the constructing comprises:
    constructing the FHMM where, at each considered time, the discrete observations are assumed to be sampled from a multinomial distribution whose observational parameter is obtained from the nominal parameter scaled by contributions from the states of the hidden dynamics.

4. The method as set forth in claim 1, wherein the sources comprise printing devices and wherein the states of at least most hidden dynamics correspond to operational states of the printing devices, and the discrete observations correspond to counts of pages printed on the printing devices.

5. The method as set forth in claim 4, wherein the outputting comprises:
    identifying a soft failure of one or more of the plurality of printing devices based on the inferred states of the hidden dynamics.

6. The method as set forth in claim 1, wherein at least one of the discrete observations has an observed value selected from three or more different discrete values.

7. The method as set forth in claim 1, wherein the inferring of states of the hidden dynamics is performed at different times from the discrete observations based on the FHMM and comprises:
  minimizing a divergence between a conditional distribution of the states given the observations and a space of independent Markov chains.

8. The method as set forth in claim 1, further comprising:
  learning parameters of the FHMM for the contributions of the states of the hidden dynamics to the discrete observation based on the acquired discrete observations, a predetermined number of hidden dynamics, and a predetermined number of states of the hidden dynamics.

9. The method as set forth in claim 1, wherein the outputting comprises:
  displaying states of at least one of the hidden dynamics at successive different times.

10. A method for predicting states of sources of observations in a system comprising a plurality of devices, the method comprising:
  with a computer, generating a factorial hidden Markov model (FHMM) of the system in which each of a plurality of the sources of observations may assume any one of a plurality of discrete states at a given time, each device including at least one of the sources, wherein a contribution of the state of each device to the discrete observation is represented in the FHMM as a parameter of a nominal observation distribution which is scaled by an observational parameter, the observational parameter being a function of the state of the device;
  in a learning stage, deriving parameters of the model by training a variational expectation maximization algorithm based on discrete observations of the devices at a plurality of prior times; and
  in an inference stage, applying the variational expectation maximization algorithm to a new set of discrete observations made at a current time to infer the current state of at least one of the devices.

11. The method of claim 10, wherein in deriving the parameters, the observations are assumed to follow a Poisson distribution.

12. The method of claim 10, wherein in deriving the parameters, the observations are assumed to follow a multinomial distribution.

13. The method of claim 10, wherein the parameters derived include:
  a transitional parameter which relates to a probability that a device is in a given state at a first time knowing its state at a second time prior to the first time; and
  an observational parameter which relates to the probability of the observations at a given time as a function of the state of the devices at that time.

14. The method of claim 10, wherein the observation distribution is obtained from the nominal exponential distribution by applying multiplicative contributions, which are dependent on the different states of each device, to nominal parameters derived from the nominal distribution.

15. The method of claim 10, wherein the devices are printers.

16. The method of claim 10, wherein the observations are counts of events.

17. A system comprising:
  a plurality of shared devices, wherein each of the shared devices is inferred to be in one of a plurality of discrete states at a given time, the discrete states being selected from a finite set of states, at least one of the shared devices is inferred to be in one of at least three states;
  a statistical analysis system which acquires discrete observations for the plurality of devices and predicts the states of the plurality of devices based on the discrete observations, the statistical analysis system employing a factorial hidden Markov model (FHMM) which relates usage data with a plurality of states of the devices, in which parameters of the model are derived by training a variational expectation maximization algorithm, the statistical analysis system inferring the states of the devices from the discrete observations based on the FHMM and outputting information corresponding to at least one inferred state of at least one of the devices.

18. The system of claim 17, wherein the contribution of the state of each device to the discrete observation is represented in the FHMM as a parameter of a nominal distribution scaled by an observational parameter which is a function of the state of the device.

19. The system of claim 17, wherein the devices are printers.

20. The system of claim 19, wherein the discrete observations are counts of pages printed on the printers.

21. The system of claim 17, wherein the FHMM assumes that each of a plurality of the devices may be in any one of a plurality of the discrete states at a given time and applies a variational expectation maximization algorithm to the discrete observations, the algorithm being based on discrete observations of the devices at a plurality of prior times.

22. The method of claim 1, wherein at least some of the sources are devices.

* * * * *